(12) United States Patent
Kuwano (10) Patent No.: US 11,305,586 B2
(45) Date of Patent: Apr. 19, 2022

(54) PNEUMATIC TIRE

(71) Applicant: TOYO TIRE & RUBBER CO., LTD., Itami (JP)

(72) Inventor: Shingo Kuwano, Itami (JP)

(73) Assignee: TOYO TIRE CORPORATION, Itami (JP)

(*) Notice: Subject to any disclaimer, the term of this patent is extended or adjusted under 35 U.S.C. 154(b) by 276 days.

(21) Appl. No.: 16/225,395

(22) Filed: Dec. 19, 2018

(65) Prior Publication Data

US 2019/0193471 A1  Jun. 27, 2019

(30) Foreign Application Priority Data

Dec. 26, 2017 (JP) .............................. JP2017-249621

(51) Int. Cl.
  *B60C 11/03* (2006.01)
  *B60C 11/12* (2006.01)
  (Continued)

(52) U.S. Cl.
  CPC .......... *B60C 11/0309* (2013.01); *B60C 11/01* (2013.01); *B60C 11/1204* (2013.01); (Continued)

(58) Field of Classification Search
  CPC .................. B60C 11/0309; B60C 11/01; B60C 2011/0358; B60C 2011/0381; B60C 11/13; B60C 11/1307; B60C 11/03
  See application file for complete search history.

(56) References Cited

U.S. PATENT DOCUMENTS 5,571,351 A * 11/1996 Hatakenaka ............ B60C 11/01
  152/209.16
2009/0255614 A1 * 10/2009 Ebiko .................. B60C 11/0306
  152/209.8
(Continued)

FOREIGN PATENT DOCUMENTS

CN    106163830 A    11/2016
DE    102010036548 A1 *  1/2012  ......... B60C 11/1369
(Continued)

OTHER PUBLICATIONS

Office Action dated Jul. 29, 2020, issued in counterpart CN Application No. 201811548372.2, with English translation (16 pages).
(Continued)

*Primary Examiner* — Timothy Kennedy
*Assistant Examiner* — Farah Taufiq
(74) *Attorney, Agent, or Firm* — Westerman, Hattori, Daniels & Adrian, LLP (57) ABSTRACT

A pneumatic tire includes a plurality of main grooves extending in a tire circumferential direction, and a plurality of land portions that are partitioned by the plurality of main grooves; the plurality of land portions include at least one shoulder land portion arranged in outwardmost fashion in a tire width direction; the at least one shoulder land portion comprises a plurality of width grooves of groove width not less than 2 mm; and at least one of the plurality of width grooves extends as far as an outside end in the tire width direction of the at least one shoulder land portion and comprises, at a location toward the exterior in the tire width direction from a contact patch end, a wide portion at which groove width increases toward a groove bottom.

11 Claims, 5 Drawing Sheets

(51) Int. Cl.
*B60C 11/13* (2006.01)
*B60C 11/01* (2006.01)

(52) U.S. Cl.
CPC ....... *B60C 11/0306* (2013.01); *B60C 11/1369* (2013.01); *B60C 2011/039* (2013.01); *B60C 2011/0341* (2013.01); *B60C 2011/0358* (2013.01); *B60C 2011/0365* (2013.01); *B60C 2011/0381* (2013.01); *B60C 2011/1213* (2013.01)

(56) References Cited

U.S. PATENT DOCUMENTS

| | | | |
|---|---|---|---|
| 2010/0186861 A1* | 7/2010 | Ishiguro | B60C 11/033 152/209.25 |
| 2017/0120692 A1* | 5/2017 | Durand-Gasselin | B60C 11/0306 |
| 2017/0341472 A1* | 11/2017 | Nakajima | B60C 11/1204 |
| 2018/0056728 A1 | 3/2018 | Yamakawa | |

FOREIGN PATENT DOCUMENTS

| | | |
|---|---|---|
| JP | 2009-190665 A | 8/2009 |
| JP | 2016-164027 A | 9/2016 |
| JP | 2017-509531 A | 4/2017 |

OTHER PUBLICATIONS

Office Action dated Sep. 10, 2021, issued in counterpart JP application No. 2017-249621, with English translation. (6 pages).

\* cited by examiner

PNEUMATIC TIRE

CROSS REFERENCE TO RELATED APPLICATIONS

This application claims the benefit of priority of Japanese application no. 2017-249621, filed on Dec. 26, 2017, which is incorporated herein by reference.

BACKGROUND OF THE INVENTION

Field of the Invention

The present invention relates to a pneumatic tire.

Description of the Related Art

Conventionally a pneumatic tire might, for example, comprise a plurality of main grooves extending in the tire circumferential direction, and a plurality of land portions which are partitioned by the main grooves (e.g., JP 2009-190665 A). In addition, shoulder land portion(s) arranged in outwardmost fashion in the tire width direction might comprise width groove(s) extending as far as outside end(s) in the tire width direction.

With pneumatic tires, it so happens that water shedding performance tends to decrease due to the lowering of the void fraction within the region of the contact patch that occurs in accompaniment to wear. On the other hand, to achieve longer pneumatic tire life, maintenance of and improvement in resistance to uneven wear are essential requirements.

SUMMARY OF THE INVENTION

The problem is therefore to provide a pneumatic tire that permits suppression of reduction in water shedding performance that might otherwise occur in accompaniment to wear and yet also makes it possible for resistance to uneven wear to be maintained.

There is provided a pneumatic tire includes:

a plurality of main grooves extending in a tire circumferential direction, and a plurality of land portions that are partitioned by the plurality of main grooves;

wherein the plurality of land portions include at least one shoulder land portion arranged in outwardmost fashion in a tire width direction;

the at least one shoulder land portion comprises a plurality of width grooves of groove width not less than 2 mm; and at least one of the plurality of width grooves extends as far as an outside end in the tire width direction of the at least one shoulder land portion and comprises, at a location toward the exterior in the tire width direction from a contact patch end, a wide portion at which groove width increases toward a groove bottom.

Further, the pneumatic tire may have a configuration in which:

all of the first ends of the plurality of width grooves are located at an interior of the at least one shoulder land portion.

Further, the pneumatic tire may have a configuration in which:

the wide portion comprises an exterior portion arranged at an outside end in the tire width direction, and an interior portion arranged toward the interior in the tire width direction from the exterior portion;

the interior portion is formed in such fashion that groove width thereof increases toward the exterior in the tire width direction; and the exterior portion is formed in such fashion that groove width thereof is constant all along the tire width direction.

Further, the pneumatic tire may have a configuration in which:

the exterior portion comprises a pair of exterior groove wall portions that face each other in the tire circumferential direction; and in a circumferential section parallel to the tread surface, the pair of exterior groove wall portions are respectively arranged so as to be parallel to the tire width direction.

Further, the pneumatic tire may have a configuration in which:

an interior end in the tire width direction of the wide portion is separated from the contact patch end.

Further, the pneumatic tire may have a configuration in which:

an outside end in a tire radial direction of the wide portion is separated from a tread surface; and the width groove comprises a constant-width portion, at which width groove is constant, between the wide portion and the tread surface.

Further, the pneumatic tire may have a configuration in which:

an interior end in the tire width direction of the wide portion is arranged toward the exterior in the tire width direction from the contact patch end;

an outside end in a tire radial direction of the wide portion is arranged toward the interior in the tire radial direction from a tread surface; and a distance between the contact patch end and the inside end in the tire width direction of the wide portion is less than a distance between the tread surface and the outside end in the tire radial direction of the wide portion.

DETAILED DESCRIPTION OF THE INVENTION

Below, an embodiment of a pneumatic tire is described with reference to FIG. 1 through FIG. 5. At the respective drawings, note that dimensional ratios at the drawings and actual dimensional ratios are not necessarily consistent, and note further that dimensional ratios are not necessarily consistent from drawing to drawing.

At the respective drawings, first direction D1 is the tire width direction D1 which is parallel to the tire rotational axis which is the center of rotation of pneumatic tire (hereinafter also referred to as simply "tire") 1, second direction D2 is the tire radial direction D2 which is the direction of the diameter of tire 1, and third direction D3 is the tire circumferential direction D3 which is circumferential with respect to the rotational axis of the tire.

Tire equatorial plane S1 refers to a plane that is located centrally in the tire width direction D1 of tire 1 and that is perpendicular to the rotational axis of the tire; tire meridional planes refer to planes that are perpendicular to tire equatorial plane S1 and that contain the rotational axis of the tire. Furthermore, the tire equator L1 is the curve formed by the intersection of tire equatorial plane S1 and the outer surface (tread surface 2a, described below) in the tire radial direction D2 of tire 1.

Figure 1:
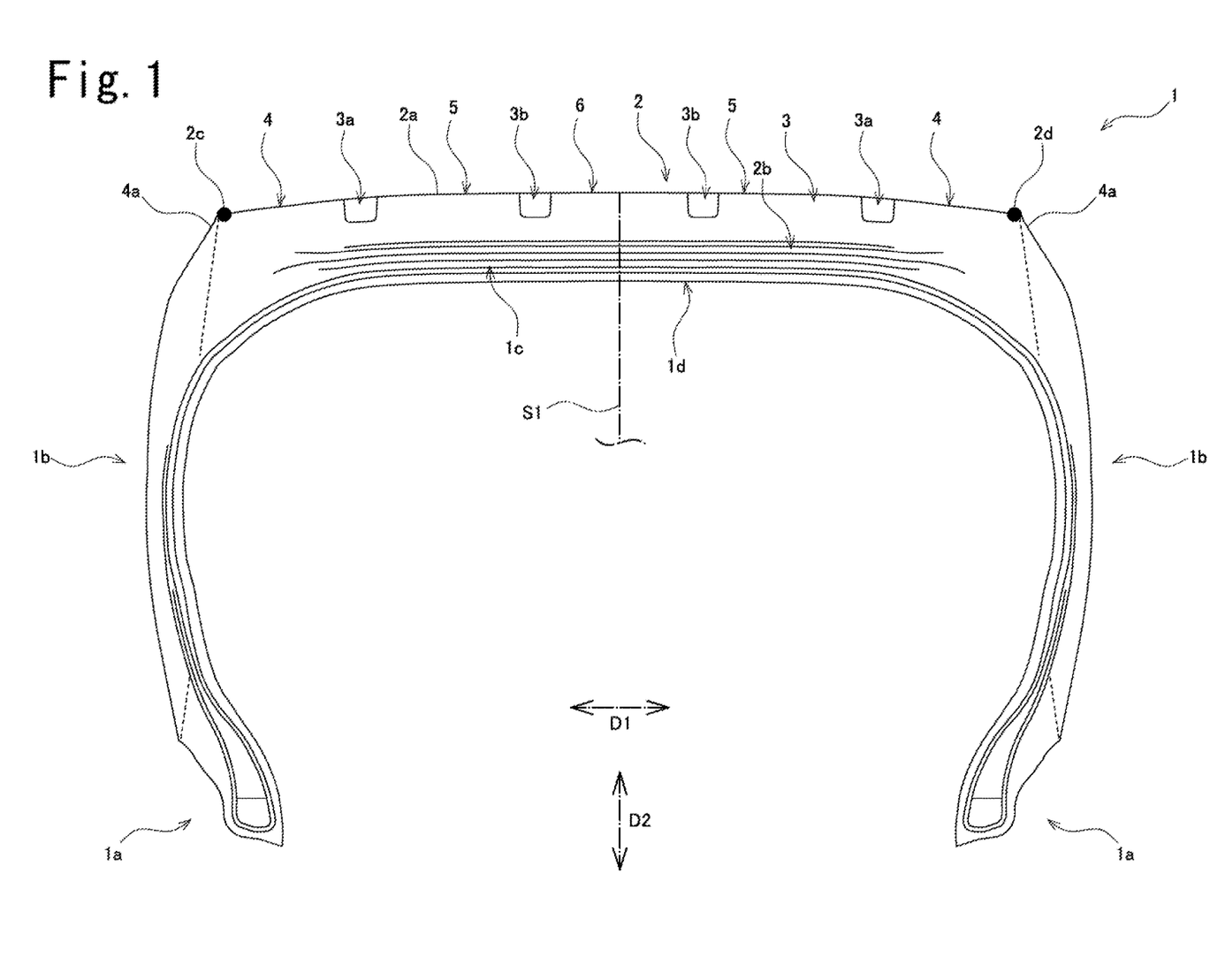
FIG. 1 is a view of a section, taken along a tire meridional plane, of the principal components in a pneumatic tire associated with an embodiment.

As shown in FIG. 1, tire 1 associated with the present embodiment is provided with a pair of bead regions 1a at which beads are present; sidewall regions 1b which extend outwardly in the tire radial direction D2 from the respective bead regions 1a; and tread region 2, the exterior surface in the tire radial direction D2 of which contacts the road surface and which is contiguous with the outer ends in the tire radial direction D2 of the pair of sideman regions 1b. In accordance with the present embodiment, tire 1 is a pneumatic tire 1, the interior of which is capable of being filled with and which is capable of being mounted on a rim (not shown).

Furthermore, tire 1 is provided with carcass layer 1c which spans the pair of beads, and innerliner layer 1d which is arranged at a location toward the interior from carcass layer 1c and which has superior functionality in terms of its ability to impede passage of gas therethrough so as to permit air pressure to be maintained. Carcass layer 1c and innerliner layer 1d are arranged in parallel fashion with respect to the inner circumferential surface of the tire over a portion thereof that encompasses bead regions 1a, sidewall regions and tread region 2. Tread region 2 is provided with tread rubber 3 having tread surface 2a which contacts the road surface, and belt layer 2b which is arranged between tread rubber 3 and carcass layer 1c.

Present at tread surface the contact that actually comes in contact with the road surface, and the portions within said contact patch that are present at the outside ends in the tire width direction D1 before occurrence of wear (when the tire is still new) are referred to as contact patch ends 2c, 2d. Hereinbelow, note that contact patch ends 2c, 2d refer to contact patch ends 2d before occurrence of wear (when the tire is still new). Furthermore, that said contact patch refers to the portion of the tread surface 2a that comes in contact with the road surface when a normal load is applied to a tire 1 mounted on a normal rim when the tire 1 is inflated to normal internal pressure and is placed in vertical orientation on a flat road surface.

Normal rim is that particular rim which is specified for use with a particular tire 1 in the context of the body of standards that contains the standard that applies to the tire 1 in question, this being referred to, for example, as a standard rim in the case of JATMA, a "Design Rim" in the case of TRA, or a "Measuring rim" in the case of ETRTO.

Normal internal pressure is that air pressure which 1 specified for use with a particular tire 1 in the context of the body of standards that contains the standard that applies to the tire 1 in question, this being maximum air pressure in the case of JATMA, the maximum value listed at the table entitled "TIRE LOAD LIMITS AT VARIOUS COLD INFLATION PRESSURES" in the case of TRA, or "INFLATION PRESSURE" in the case of ETRTO, which when tire 1 is to used on a passenger vehicle is taken to be an internal pressure of 180 KPa.

Normal load is that load which is specified for use with a particular tire 1 in the context of the body of standards that contains the standard that applies to the tire 1 in question, this being maximum load capacity in the case of JATMA, the maximum value listed at the aforementioned table in the case of TRA, or "LOAD CAPACITY" in the case of ETRTO, which when tire 1 is to be used on a passenger vehicle is taken to be 85% of the load corresponding to an internal pressure of 180 KPa.

Figure 2:
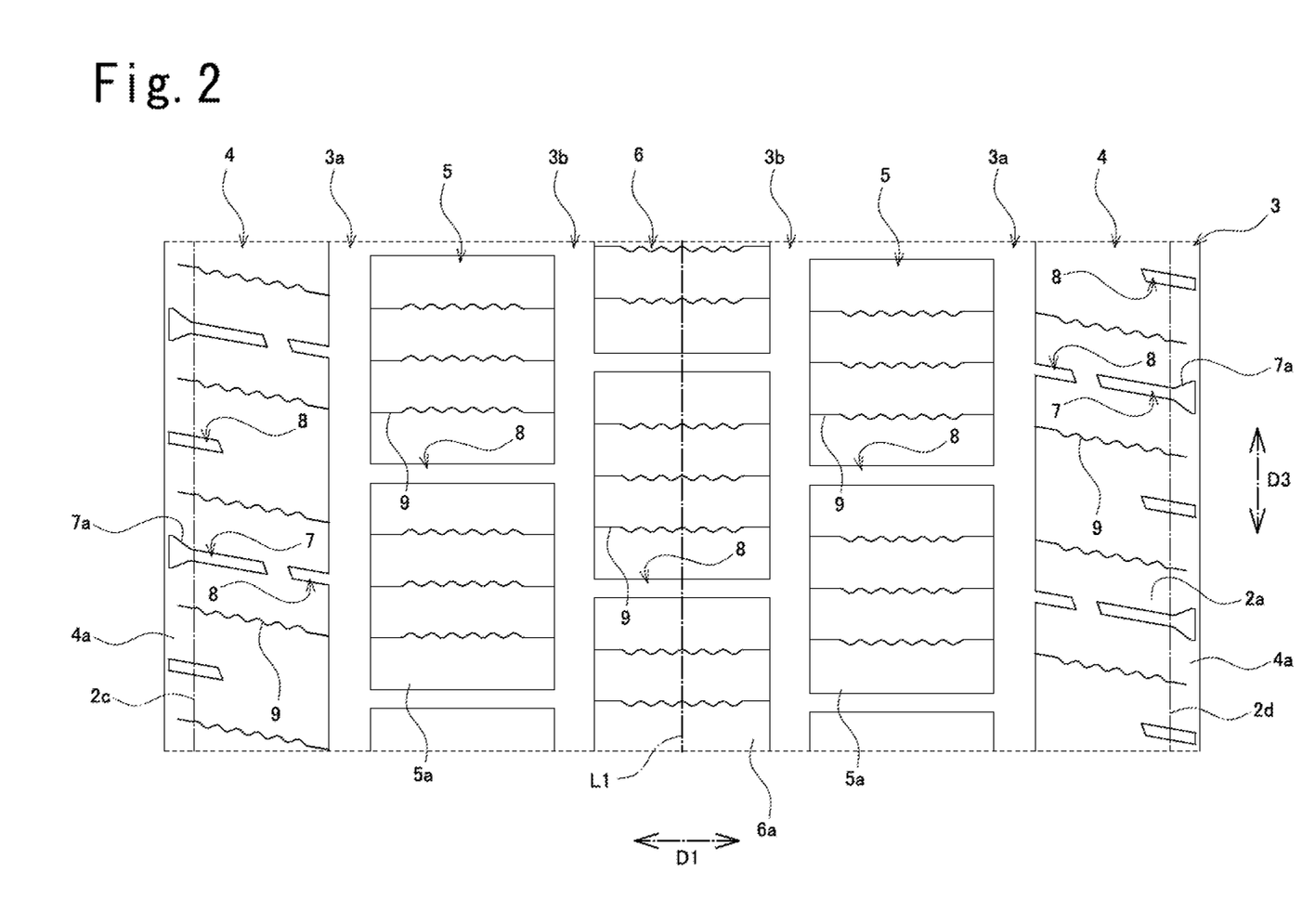
FIG. 2 is a drawing showing a tread surface of the principal components in a pneumatic tire associated with same embodiment as they would exist if unwrapped so as to lie in a single plane.

As shown in FIG. 1 and FIG. 2, tread rubber 3 is provided with a plurality of main grooves 3a, 3b extending in the tire circumferential direction D3. Main groove 3a, 3b extends continuously in the tire circumferential direction D3. Note that whereas main grooves 3a, 3b extend in straight fashion in the tire circumferential direction D3 in the present embodiment, there is no limitation with respect to such constitution, it also being possible to adopt a constitution in which these are, for example, repeatedly bent such that they extend in zigzag fashion, or a constitution in which these are, for example, repeatedly curved such that they extend in wavy fashion.

Main groove 3a, 3b might, for example, be provided with so-called tread wear indicator (s) (not shown) which are portions at which depth of the groove is reduced so as to make it possible to ascertain the extent to which wear has occurred as a result of the exposure thereof that takes place in accompaniment to wear. Furthermore, main groove 3a, 3b might, for example, have a width that is not less than 3% of the distance (dimension in the tire width direction D1) between contact patch ends 2c, 2d. Furthermore, main groove 3a, 3b might for example, have a width that is not less than 5 mm.

Furthermore, at the plurality of main grooves 3a, 3b, the pair of main grooves 3a, 3a arranged at outermost locations in the tire width direction D1 are referred to as shoulder main grooves 3a, and the main groove(s) 3b arranged between the pair of shoulder main grooves 3a, 3a are referred to as center main groove(s) 3b. Note that whereas in the present embodiment the number of center main groove(s) 3b that are present is two, there is no limitation with respect to such constitution, it also being possible, for example, for there to be one thereof, or three or more thereof. Note that main grooves 3a, 3b are each formed in such fashion that the groove width thereof decreases toward the bottom of the groove.

Tread rubber 3 is provided with a plurality of land portions 4 through 6 which are partitioned by main grooves 3b. At the plurality of land portions 4 through 6, land portion(s) 4 which are arranged toward the exterior in the tire width direction D1 from shoulder main groove 3a are referred to as shoulder land portion(s) 4, and land portion(s) 5, 6 which are partitioned respective main grooves 3a, 3b adjacent thereto and which are arranged between the pair of shoulder land portion(s) 4, 4 are referred to as middle land portion(s) 5, 6.

Note, at middle land portion(s) 5, 6 land portion(s) 5 which are partitioned by shoulder main groove 3a and center main groove 3b are referred to as mediate land portion(s) 5, and land portion(s) 6 which are partitioned by respective center main grooves 3b, 3b are referred to as center land portion(s) 6. In accordance with the present embodiment, center main groove(s) 3b, 3b are arranged so as to straddle tire equator L1, this being the case, center land portion 6 are arranged in such fashion as to contain tire equator L1.

Land portions 4 through 6 are provided with a plurality of land grooves 7 through 9. The plurality of land grooves 7 through 9 extend so as to intersect the tire circumferential direction D3. In addition, of the land grooves 7 through 9 that extend so as to intersect the tire circumferential direction D3, land groove(s) 7, 8 of groove width not less than 2.0 mm are referred to as width groove(s) 7, 8, and land groove(s) 9 of groove width less than 2.0 mm are referred to as sipe(s) 9. Note, moreover, that land portions 4 through 6 may be provided with land groove(s) that extend in continuous or intermittent fashion in the tire circumferential direction D3 and that are of groove width (s) less than the groove width (s) of main grooves 3a, 3b, such land groove (s) being referred to as circumferential groove(s).

Width grooves 8 provided at middle land portions 5, 6 are arranged along the full breadth in the tire width direction D1 of middle land portions 5, 6. That is, the two ends of each width groove 8 provided at middle land portions 5, 6 are respectively contiguous with main grooves 3a, 3b.

As a result, middle land portions 5, 6 comprise blocks 5a, 6a produced as a result of partitioning by width grooves 8. That is, middle land portions 5, 6 are in the shape of blocks made up of the plurality of blocks 5a, 6a. Note that it is also possible to adopt a constitution in which at least one of middle land portions 5, 6 is in the shape of a rib connected in continuous fashion all along the tire circumferential direction D3.

At width groove 8 arranged toward the interior in the tire width direction D1 at shoulder land portion 4, the exterior end (first end) terminates at the interior of shoulder land portion 4, being closed; and the interior end (second end) is contiguous with shoulder main groove 3a, being open. In addition, at width groove 7, 8 arranged toward the exterior in the tire width direction D1 at shoulder land portion 4, the interior end (first end) terminates at the interior of shoulder land portion 4, being closed; and the exterior end (second end) extends as far as the outside end (outside face 4a) of shoulder land portion 4, being open.

Thus, because the first end of width groove 7, 8 provided at shoulder land portion 4 is located at the interior of shoulder land portion 4, shoulder land portion 4 is in the shape of a rib connected in continuous fashion all along the tire circumferential direction D3. As a result, because it will be possible to improve the rigidity of shoulder land portion 4, this will make it possible to suppress occurrence of uneven wear at shoulder land portion 4.

Note that sipes 9 provided at shoulder land portions 4 are arranged along the full breadth in the tire width direction D1 of shoulder land portions 4. But because the groove width of sipe 9 is small, shoulder land portion 4 is not functionally (substantially) divided by sipe 9, and so it is fair to say that it is in the shape of a rib. To further increase rigidity of shoulder land portion 4, note that it is also possible to adopt a constitution in which first ends of all land grooves 7 through 9 provided at shoulder land portion 4 are located at the interior of shoulder land portion 4.

Figure 3:
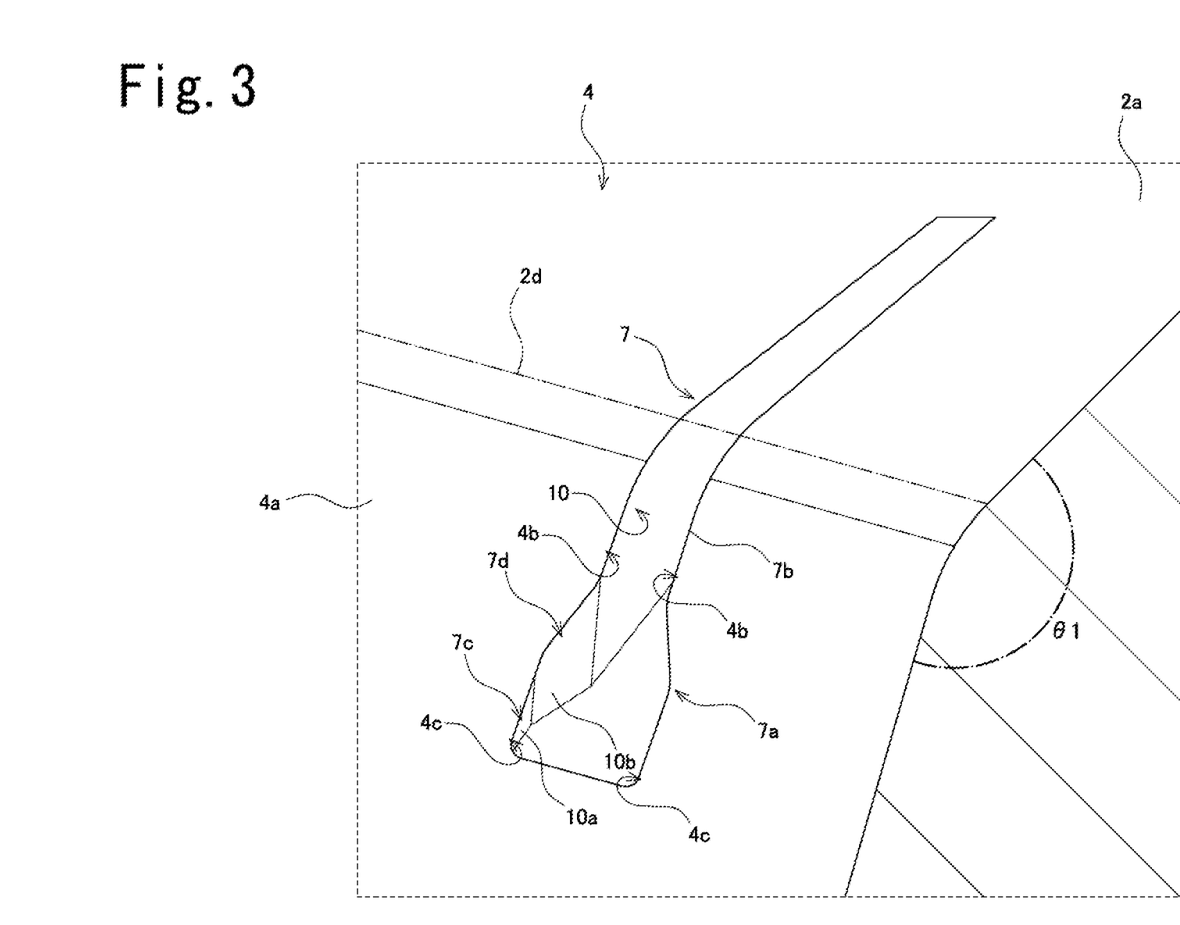
FIG. 3 is a perspective view of the principal components of a pneumatic tire associated with same embodiment.

As shown in FIG. 3, while there is no particular limitation with respect to intersection angle 91 at which tread surface 2a and outside face 4a of shoulder land portion 4 intersect, this might, for example, be made to be not greater than 140°. Note that said intersection angle θ1 might, for example, be made to be not greater than 130°, or might be made to be not greater than 120°. Furthermore, a curved surface (radiused surface) may be provided between tread surface 2a and outside face 4a.

Figure 4:
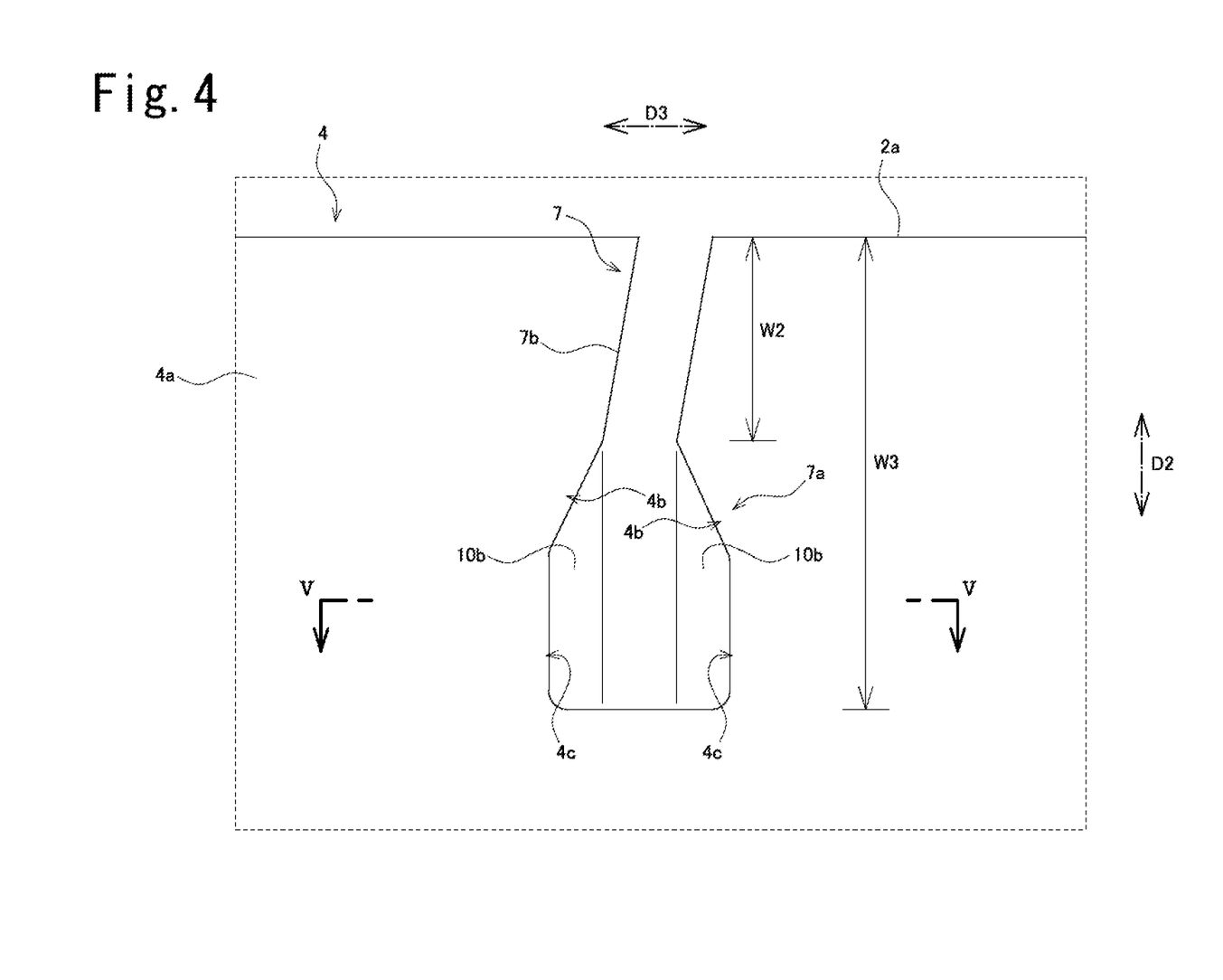
FIG. 4 is a side view of the principal components of a pneumatic tire associated with same embodiment.

As shown in FIG. 2 through FIG. 4, at least one of the width groove(s) 7 that extend as far as outside face 4a of shoulder land portion 4 comprises wide portion 7a at which groove width increases toward the groove bottom. In accordance with the present embodiment, one-half of the width that extend as far as outside 4a of shoulder land portion 4 comprise wide portion(s) 7a.

Note, however, that it is sufficient that at least one of the width grooves 7 that extend as far as outside face of shoulder land portion 4 comprise wide portion(s) 7a. On the other hand, it is preferred that at least one-third of the width grooves 7 that extend as far as outside face 4a of shoulder land portion 4 comprise wide portions 7a, more preferred that at least one-half of the width grooves 7 comprise wide portions 7a, and very much preferred that all of the width grooves 7 comprise wide portions 7a.

Figure 5:
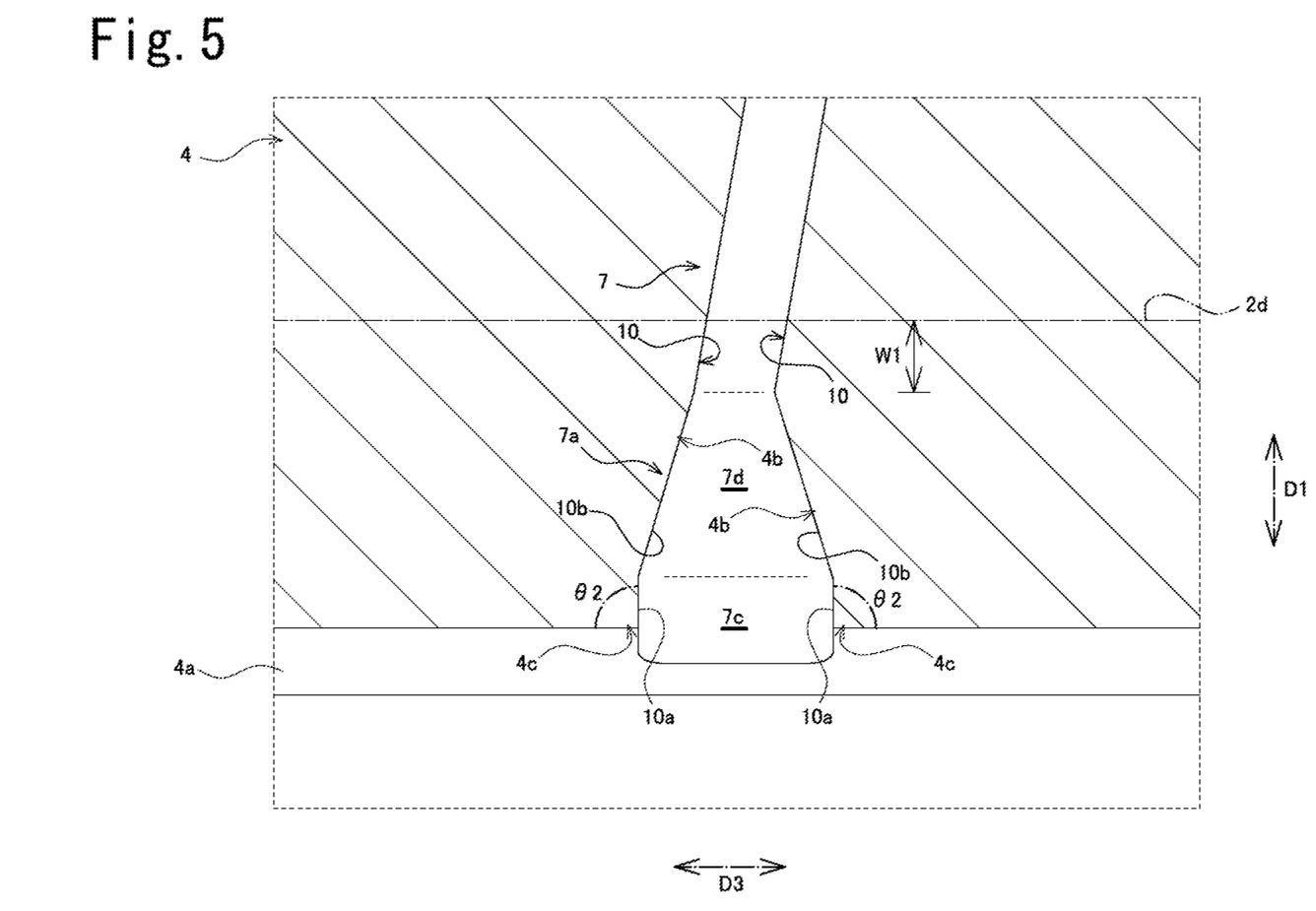
FIG. 5 is a view of the principal components of a section taken along V-V in FIG. 4.

As shown in FIG. 3 through FIG. 5, the outside end in the tire radial direction D2 of wide portion 7a is separated from tread surface 2a. More specifically, width groove 7 comprises constant-width portion 7b, at which groove width is constant, between wide portion 7a and tread surface 2a. It is, for example, preferred that the maximum groove width of wide portion 7a be, for example, not less than 150% if the groove width of constant-width portion 7b, more preferred that this be not less than 200% thereof, and very much preferred that this be not less than 300% thereof.

Wide portion 7a comprises exterior portion 7c arranged at the outside end in the tire width direction D1, and interior portion 7d arranged toward the interior in the tire width direction D1 from exterior portion 7c. In addition, interior portion 7d is formed such that the groove width thereof increases toward the exterior in the tire width direction D1, and exterior portion 7c is formed such that the groove width thereof is constant all along the tire width direction D1. Accordingly, at wide portion 7a, groove width increases toward the interior in the tire radial direction D2, and groove width also increases toward the exterior in the tire width direction D1.

Furthermore, width groove 7 comprises a pair of groove wall portions 10, 10 that face each other in the tire circumferential direction D3. In addition, groove wall portions 10, 10 respectively comprise exterior groove wall portions 10a, 10a that constitute exterior portion 7c of wide portion 7a, and interior groove wall portions 10b, 10b that constitute interior portion 7d of wide portion 7a. Note that the interior end in the tire width direction D1 of wide portion 7a is separated from contact patch end 2d.

In addition, as shown in FIG. 5, in a circumferential section parallel to tread surface 2a, whereas distance between interior groove wall portions 10b, 10b increases toward the exterior in the tire width direction D1, exterior groove wall portions 10a, 10a are mutually parallel. As a result, it is possible to suppress occurrence of a situation in which the outer ends in the tire width direction D1 of exterior groove wall portions 10a, 10a become separated by too much distance from each other. Accordingly, because it will be possible to suppress occurrence of a mutual difference in rigidity between adjacent portions 4b, 4b which are adjacent in the tire circumferential direction D3 in such fashion as to straddle width groove 7 therebetween, it will be possible to suppress occurrence of uneven wear at adjacent portions 4b, 4b.

What is more, in a circumferential section parallel to tread surface 2a, exterior groove wall portions 10a, 10a are respectively parallel to the tire width direction D1. This being the case, intersection angle θ2 at which exterior groove wall portion 10a and outside face 4a shoulder land portion 4 intersect is a right angle, (including not only the situation in which this is exactly a right angle but also the situation in which this is approximately a right angle).

Accordingly, in a circumferential section parallel to tread surface 2a, exterior groove wall portion 10a is perpendicular to outside face 4a of shoulder land portion 4. As a result, because it will be possible to suppress reduction in rigidity at intersecting region 4c where exterior groove wall portion 10a and outside face 4a of shoulder land portion 4 intersect, it will be possible to suppress occurrence of uneven wear at said intersecting region 4c.

Constitution of tire associated with the present embodiment is as described above; action of tire 1 associated with the present embodiment is described below.

First, to address the possibility that wide portion 7a could cause a decrease in the rigidity of shoulder land portion 4, wide portion 7a is arranged at a location toward the exterior in the tire width direction D1 from contact patch end 2c, 2d. As a result, before occurrence of wear (when the tire is still new) and during the initial stages of wear (during the initial stages of use), wide portion 7a exerts little influence on the rigidity of shoulder land portion 4. Accordingly, because it is possible to suppress decrease in rigidity at shoulder land portion 4, it is possible to maintain resistance to uneven wear.

It so happens that because the groove width of main groove 3a, 3b decreases toward the groove bottom, the void fraction attributable to main groove 3a, 3b within the region of the contact patch is reduced in accompaniment to wear of tire 1. But because the region of the contact patch in the tire width direction D1 grows larger in accompaniment to wear of tire 1, a wide portion 7a which was arranged at a location toward the exterior in the tire width direction D1 from contact patch end 2c, 2d before occurrence of wear will be located within the region of the contact patch after occurrence of wear.

This being the case, while the void fraction attributable to main groove 3a, 3b within the region of the contact patch decreases upon occurrence of wear, the fact that wide portion 7a comes in contact with the road surface makes possible to suppress reduction in the void fraction within the region of the contact patch despite occurrence of wear. What is more, at wide portion 7a, groove width increases not only toward the interior in the tire radial direction D2 hot also toward the exterior in the tire width direction D1. Accordingly, it is possible to effectively suppress reduction water shedding performance that might otherwise occur in accompaniment to wear.

So that wide portion 7a will come in contact with the road surface upon occurrence of wear, it is preferred that first distance W1 between contact patch end 2d and the side end in the tire width direction D1 of wide portion 7a be less, than second distance W2 between tread surface 2a and the outside end in the tire radial direction D2 of wide portion 7a. It is, for example, preferred that first distance W1 be not greater than 50% of second distance W2, more preferred that this be not greater than 40% thereof, and very much preferred that this be not greater than 30% thereof.

Moreover, so that wide portion 7a will definitely come in the contact with the road surface upon occurrence of wear, first distance W1 may be made to be zero; i.e., the inside end in the tire width direction D1 of wide portion 7a may be located contact patch end 2c, 2d. Accordingly, where it is said that "wide portion 7a is arranged at a location toward the exterior in the tire width direction D1 from a contact patch end 2c, 2d", this should be understood to include the situation in which the inside end in the tire width direction D1 of wide portion 7a is located at contact parch end 2c, 2d in the tire width direction D1.

Furthermore, it is, for example, preferred that second distance W2 be not less than 30% of depth W3 of width groove 7 having wide portion 7a, and more preferred that this be not less than 40% thereof. For example, because there will be a tendency for rigidity toward tread surface 2a at shoulder land portion 4 to decrease when said second distance W2 is less than 30% of said depth W3 of width groove 7, by causing said second distance W2 to be not less than 30% of said depth W3 of width groove 7, it will be possible to suppress reduction in rigidity toward tread surface 2a at shoulder land portion 4.

Furthermore, for example, preferred that second distance W2 be not greater than 70% of depth W3 of width groove 7 having wide portion and more preferred that this be not greater than 60% thereof. For example, because it is difficult to obtain the benefit whereby water shedding performance improved due to wide portion 7a when said second distance W2 exceeds 70% of said depth W3 of width groove 7, by causing said second distance W2 to be not greater than 70% of said depth W3 of width groove 7, it will be possible to obtain the benefit whereby water shedding performance improved due to wide portion 7a.

As described above, the pneumatic tire 1 of the embodiment includes: a plurality of main grooves 3a, 3b extending in a tire circumferential direction D3, and a plurality of land portions 4 through 6 that are partitioned by the plurality of main grooves 3a, 3b; wherein the plurality of land portions 4 through include at least one shoulder land portion 4 arranged in outwardmost fashion in a tire width direction D1; the at least one shoulder land portion 4 comprises plurality of width grooves 7, 8 of groove width not less than 2 mm; and at least one 7 of the plurality of width grooves 7, 8 extends as far as an outside end in the tire width direction D1 of the at least one shoulder land portion 4 and comprises, at a location toward the exterior in the tire width direction D1 from a contact patch end 2c, 2d, a wide portion 7a at which groove width increases toward a groove bottom.

In accordance with such constitution, to address the fact that the region of the contact patch in the tire width direction D1 grows larger in accompaniment to wear of tire at least one of the width grooves 7 comprises a wide portion 7a at which groove width increases toward the groove bottom at a location toward the exterior in the tire width direction D1 from contact patch end 2c, 2d. As a result, in accompaniment to wear of tire 1, because wide portion 7a comes in contact with the road surface, it is possible to suppress reduction in the void fraction within the region of the contact patch that would otherwise occur with wear.

What is more, because wide portion 7a is arranged at a location toward the exterior in the tire width direction D1 from contact patch end 2c, 2d, wide portion 7a exerts little influence on the rigidity of shoulder land portion 4 before occurrence of wear (when the tire is still new) and during the initial stages of wear (during the initial stages of use). This makes it possible to suppress reduction in rigidity of shoulder land portion 4. Accordingly, not only is it possible to maintain resistance to uneven wear, it is also possible to suppress reduction in water shedding performance in accompaniment to wear.

Further, in the pneumatic tire 1 of the embodiment, all of the first ends of the plurality of width grooves 7, 8 are located at an interior of the at least one shoulder land portion 4.

In accordance with such constitution, because the first ends of all width grooves 7, 8 provided at shoulder land portion 4 are located at the interior of shoulder land portion 4, shoulder land portion 4 is connected in continuous fashion all along the tire circumferential direction D3. This makes it possible to improve the rigidity of shoulder land portion 4.

Further, in the pneumatic tire 1 of the embodiment, the wide portion 7a comprises an exterior portion 7c arranged at an outside end in the tire width direction D1, and an interior portion 7d arranged toward the interior in the tire width direction D1 from the exterior portion 7c; the interior portion 7d is formed in such fashion that groove width thereof increases toward the exterior in the tire width direction D1; and the exterior portion 7c is formed n such fashion that groove width thereof is constant all along the tire width direction D1.

In accordance with such constitution, because groove width at interior portion 7d of wide portion 7a increases toward the exterior in the tire width direction D1, it is possible to effectively suppress reduction in the void fraction at the region of the contact patch that might otherwise occur with wear. What is more, because groove width of exterior portion 7c is constant all along the tire width direction D1, it is possible to suppress occurrence of a mutual difference in rigidity between adjacent portions 4b, 4b which are adjacent in the tire circumferential direction D3 in such fashion as to straddle wide portion 7a therebetween.

Further, in the pneumatic tire 1 of the embodiment, the exterior portion. 7c comprises a pair of exterior groove wall portions 10a, 10a that face each other in the tire circumferential direction D3; and in a circumferential section parallel to the tread surface 2a, the pair of exterior groove wall portions 10a, 10a are respectively arranged so as to be parallel to the tire width direction D1.

In accordance with such constitution, because, in a circumferential section parallel to tread surface 2a, exterior groove wall portions 10a are parallel to the tire width direction D1, intersecting regions 4c where respective exterior groove wall portions 10a and outside face 4a in the tire width direction D1 of shoulder land portion 4 intersect are mutually perpendicular. This makes it possible to suppress reduction in rigidity at said intersecting regions 4c.

The pneumatic tire 1 is not limited to the configuration of the embodiment described above, and the effects are no t limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like: of the embodiments described above, as a matter of course.

(1) The constitution of pneumatic tire 1 associated with the foregoing embodiment is such that wide portion 7a is formed in tapered fashion such that the groove width thereof increases toward the groove bottom. However, pneumatic tire 1 is not limited to such constitution. For example, it is also possible to adopt a constitution in which wide portion 7a is formed in staircase-like fashion such that the groove width thereof increases toward the groove bottom.

(2) Furthermore, the constitution of pneumatic tire 1 associated with the foregoing embodiment is such that, in a circumferential section plane parallel to tread surface 2a, wide portion 7a is formed in tapered fashion such that the groove width thereof increases toward the exterior in the tire width direction D1. However, pneumatic tire 1 is not limited to such constitution. It is also possible to adopt a constitution in which, in a circumferential section parallel to tread surface 2a, wide portion 7a is formed in staircase-like fashion such that the groove width thereof increases toward the exterior in the tire width direction D1.

(3) Furthermore, the constitution of pneumatic tire 1 associated with the foregoing embodiment is such that shoulder land portion 4 is in the shape of a rib connected in continuous fashion all along the tire circumferential direction D3. However, while such constitution is preferred, pneumatic tire 1 is not limited to such constitution. For example, it is also possible to adopt a constitution in which shoulder land portion 4 is in the shape of blocks due to the fact that it comprises blocks produced as a result of partitioning by width groove(s) 7, 8.

(4) Furthermore, the constitution of pneumatic tire 1 associated with the foregoing embodiment is such that wide portion 7a is formed in such fashion that the groove width thereof increases toward the exterior in the tire width direction D1. However, while such constitution is preferred, pneumatic tire 1 not limited to such constitution. For example, it is also possible to adopt a constitution in which wide portion 7a is formed in such fashion that the groove width thereof is constant all along the tire width direction D1.

(5) Furthermore, the constitution of pneumatic tire 1 associated with the foregoing embodiment is such that exterior portion 7c of wide portion 7a is formed in such fashion that the groove width thereof is constant all along the tire width direction D1. However, while such constitution is preferred, pneumatic tire 1 not limited to such constitution. For example, it is also possible to adopt a constitution in which exterior portion 7c of wide portion 7a is formed in such fashion that, like interior portion 7d, the groove width thereof increases toward the exterior in the tare width direction D1.

(6) Furthermore, the constitution of pneumatic tire associated with the foregoing embodiment is such that, in a circumferential section parallel tread surface 2a, exterior groove wall portion 10a is arranged so as to be parallel to the tire width direction D1. However, while such constitution is preferred, pneumatic tire 1 is not limited to such constitution. For example, it is also possible to adopt a constitution in which, in a circumferential section parallel to tread surface 2a, exterior groove wall portion 10a is arranged so as to be inclined with respect to and intersect the tire width direction D1.

The invention claimed is:

1. A pneumatic tire, comprising:
a plurality of main grooves extending in a tire circumferential direction, and a plurality of land portions that are partitioned by the plurality of main grooves, wherein the plurality of land portions include at least one shoulder land portion arranged outwardmost in a tire width direction;
each of the at least one shoulder land portion comprises a plurality of width grooves of groove width not less than 2 mm;
wherein the plurality of width grooves comprise a first width groove and a second width groove;
wherein the first width groove extends as far as an outside end in the tire width direction of the at least one shoulder land portion and comprises, at a location toward the exterior in the tire width direction from a contact patch end, a wide portion at which groove width increases toward the outside end in the tire width direction;
wherein the second width groove extends as far as the outside end in the tire width direction of the at least one shoulder land portion and comprises a constant width without a wide portion at which groove width increases toward the outside end in the tire width direction;

wherein all of the first ends of the first and second width grooves terminate within an interior of the at least one shoulder land portion such as not to connect to any of the plurality of main grooves;

the plurality of width grooves further comprise a third width groove, and the third width groove comprises a constant width without a wide portion at which groove width increases toward the inside end in the tire width direction;

the first width groove and the third width groove are arranged to have a portion thereof mutually overlapping as viewed in the tire width direction;

the third width groove is arranged toward the interior in the tire width direction from the first width groove;

the first width groove is entirely separated from the third width groove;

the second width groove is separated from the first width groove in the tire circumferential direction;

the at least one shoulder land portion further comprises at least one sipe of groove width less than 2 mm, wherein the at least one sipe extends from one of the plurality of main grooves to the contact patch end such that the at least one sipe is arranged along a full breadth of the at least one shoulder land portion in the tire width direction; and the at least one sipe is arranged between the first width groove and the second width groove in the tire circumferential direction.

2. The pneumatic tire according to claim 1 wherein the wide portion comprises an exterior portion arranged at an outside end in the tire width direction, and an interior portion arranged toward the interior in the tire width direction from the exterior portion;

the interior portion is formed in such fashion that groove width thereof increases toward the exterior in the tire width direction; and the exterior portion is formed in such fashion that groove width thereof is constant all along the tire width direction.

3. The pneumatic tire according to claim 2 wherein the exterior portion comprises a pair of exterior groove wall portions that face each other in the tire circumferential direction; and in a circumferential section parallel to the tread surface, the pair of exterior groove wall portions are respectively arranged so as to be parallel to the tire width direction.

4. The pneumatic tire according to claim 1 wherein an interior end in the tire width direction of the wide portion is separated from the contact patch end.

5. The pneumatic tire according to claim 1 wherein an outside end in a tire radial direction of the wide portion is separated from a tread surface; and the width groove comprises a constant-width portion, at which width groove is constant, between the wide portion and the tread surface.

6. The pneumatic tire according to claim 1 wherein an interior end in the tire width direction of the wide portion is arranged toward the exterior in the tire width direction from the contact patch end;

an outside end in a tire radial direction of the wide portion is arranged toward the interior in the tire radial direction from a tread surface; and a distance between the contact patch end and the inside end in the tire width direction of the wide portion is less than a distance between the tread surface and the outside end in the tire radial direction of the wide portion.

7. The pneumatic tire according to claim 1 wherein all of the at least one sipe is separated from the second width groove in the tire circumferential direction such that the second width groove and all of the at least one sipe are arranged to have no portion thereof mutually overlapping as viewed in the tire width direction.

8. The pneumatic tire according to claim 1 wherein the first width groove further comprises a constant-width portion, at which groove width is constant, between the wide portion and a tread surface in a tire radial direction, and the maximum groove width of the wide portion is not less than 200% the groove width of the constant-width portion.

9. The pneumatic tire according to claim 1 wherein the first width groove further comprises a constant-width portion, at which groove width is constant, between the wide portion and a tread surface in a tire radial direction, and the maximum groove width of the wide portion is not less than 300% the groove width of the constant-width portion.

10. The pneumatic tire according to claim 1, wherein each of the at least one shoulder land portion includes an array of the at least one width groove with the wide portion and the at least one width groove with a constant width in a tire circumferential direction.

11. The pneumatic tire according to claim 10, wherein said array includes alternating between the at least one width groove with the wide portion and the at least one width groove with a constant width.

* * * * *